United States Patent Office 3,503,992
Patented Mar. 31, 1970

3,503,992
3,4-DISUBSTITUTED TETRAHYDROTHIOPHENE-1,1-DIOXIDE
Henry E. Fritz, Charleston, and William E. Maycock, St. Albans, W. Va., and Robert P. Yunick, Schenectady, N.Y., assignors to Union Carbide Corporation, a corporation of New York
No Drawing. Filed Sept. 14, 1964, Ser. No. 396,387
Int. Cl. C07d 63/04
U.S. Cl. 260—332.1          9 Claims

ABSTRACT OF THE DISCLOSURE

This invention relates to 3,4-disubstituted tetrahydrothiophene-1,1-dioxides and to a method for their production. More particularly, this invention relates to 3,4-diethers and dithioethers of tetrahydrothiophene-1,1-dioxide and to a method for their production via the base-catalyzed reaction of an aliphatic alcohol or mercaptan with a 3,4-dihalotetrahydrothiophene-1,1-dioxide.

---

The process of this invention can be represented by the general equation:

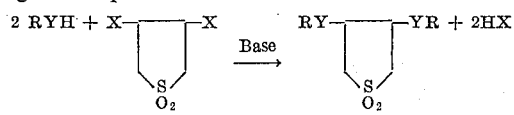

wherein R is a residue of an aliphatic, i.e., non-phenolic, alcohol or mercaptan; Y is a member selected from the group consisting of oxygen and sulfur; and X is a halogen such as fluorine, chlorine, bromine or iodine.

Any aliphatic alcohol or thiol, saturated or unsaturated, cyclic or acyclic, containing an aromatic moiety or not, can be employed in the process of this invention, provided it has no reactive groups other than hydroxyl or mercapto groups, such as primary or secondary amino groups, and contains at least one hydroxyl or mercapto group bonded to an aliphatic; i.e., nonaromatic, carbon atom. Carboxyl groups are not reactive, and, thus, hydroxy acids can be employed. The alcohols or thiols can be monohydric or polyhydric, monomeric or polymeric, without departing from the scope of this invention. Furthermore, compounds which contain functional groups which, under the reaction conditions employed, form a hydroxyl or mercapto group, can also be employed. For example, formaldehyde, when in an aqueous medium is present in an equilibrium mixture with its water adduct, dihydroxymethane, which then reacts in accordance with this invention. Similarly, lactones, when in basic medium containing an alkali metal hydroxide, hydrolyze to form an alkali metal salt of a hydroxy acid, which in turn reacts in accordance with this invention.

As examples of suitable alcohols and mercaptans one can mention methanol, ethanol, isopropanol, tert-butanol, 2-ethylhexanol, 2-butyloctanol, 3,9-diethyltridecanol, allyl alcohol, decenol, cyclopentenol, bicyclo[2.2.1]hept-2-en-5-ol, bicyclo[2.2.1]hept-2-ylmethanol, tricyclo[5.2.1.0] decenol, benzyl alcohol, 2-vinylbenzylalcohol, phenethyl alcohol, cyclopentanol, cyclohexanol, ethylene glycol, propylene glycol, 1,3-propanediol, 2,2-diethyl-1,3-propanediol, 3,4-heptanediol, 1,2,6-hexanetriol, glycerol, diethylene glycol, triethylene glycol, pentaethylene glycol, dipropylene glycol, methoxyethanol, benzyloxyethanol, butoxydiglycol, butoxytriglycol, phenoxyethoxyethanol, vinyloxyethoxyethanol, cellulose and cellulosic materials such as cotton, rayon, linen, cellulose acetate and the like, methanethiol butanethiol, 1,2-ethanedithiol, cyclohexanethiol, phenylmethanethiol, butyrolactone, hydroxyacetic acid, $\beta$-hydroxybutyric acid, 2-mercaptoethanol, 4-mercaptobutyric acid, and the like.

A preferred class of alcohols are those represented by the formula:

(I) 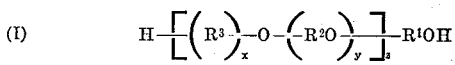

wherein $R^1$ is a divalent hydrocarbon group of from 1 to about 20 carbons; $R^2$ is a divalent hydrocarbon group of from 2 to about 20 carbons; $R^3$ is a divalent hydrocarbon group of from 1 to 20 carbons; $x$ is an integer having a value of from 0 to 1; $y$ is an integer having a value of from 0 to about 20; and $z$ is an integer having a value of from 0 to 1. The hydrocarbon groups represented by $R^1$, $R^2$ and $R^3$ can be of any type, including saturated and unsaturated aliphatic, saturated and unsaturated cyclophatic, and aromatic radicals, provided that at least one hydroxyl group is bonded to an aliphatic carbon atom.

When $y$ in Formula I is a positive integer, it is preferred that each of $R^1$ and $R^2$ have from 2 to 3 carbons, and that $R^1$, $R^2$ and $R^3$ be saturated aliphatic groups. These compounds can be represented by the formula:

(II) 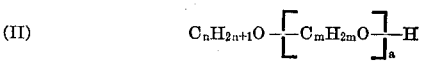

wherein $n$ is an integer having a value of from 0 to 15; $m$ is an integer having a value of from 2 to 3; and $a$ is an integer having a value of from 2 to about 20.

The amount of alcohol employed in the process of this invention is not particularly critical. However, yields are low unless the alcohol is present in an amount which provides at least two hydroxyl groups per molecule of 3,4-dihalotetrahydrothiophene-1,1-dioxide. Amounts greater than this can be employed if desired, with the excess over the stoichiometric amount required for the reaction serving as a reaction solvent.

The base employed in the process of this invention is believed to serve two functions; the first as a dehydrohalogeneration agent in removing two molecules of hydrogen halide from the dihalotetrahydrothiophene-1,1-dioxide to form an intermediate and the second as a catalyst for the reaction of the intermediate with the alcohol. Thus, any base which serves these two functions can be employed, such as the alkali metal and alkaline earth hydroxides and quarternary ammonium hydroxides. Sodium carbonate, which is a dehydrohalogenation agent cannot be employed, however, because it will not catalyze the reaction with the alcohol. Preferred bases are the alkali metal hydroxides such as linthium hydroxide, sodium hydroxide, potassium hydroxide and the like.

The reaction promoting amount of base can vary widely, provided there are more than two moles of base per mole of dihalotetrahydrothiophene-1,1-dioxide in the reaction mixture. The catalytic excess necessary to effect the reaction of the alcohol can be as low as 1 mole percent and up to 50 or more mole percent, based on the dihalotetrahydrothiophene-1,1-dioxide.

A preferred method for conducting the process of this invention comprises adding the dihalotetrahydrothiophene-1,1-dioxide to the base in the presence of the alcohol. If the base is added slowly to the dihalotetrahydrothiophene dioxide, the base is consumed in the dehydrohalogenation, and the resulting intermediate reacts to form a compound of the formulae:

(III) 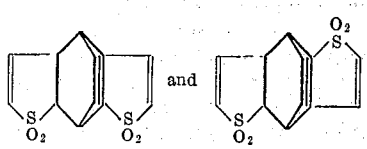

Although the amount of this compound formed could be reduced by a rapid addition of base to dihalotetrahydrothiophene-1,1-dioxide, the reaction is highly exothermic and is difficult to control. These problems are avoided when the preferred technique is employed, and, in addition, the base and alcohol will be present in excess amounts over the dihalotetrahydrothiophene-1,1-dioxide.

The reaction temperature is not narrowly critical and temperatures in the range of from −30° C. or lower up to 200° C. for higher can be employed. Temperatures in the range of 5° C. to 70° C. are preferred.

The process can be conducted in the presence of various inert hydrocarbon diluents or solvents, if desired. It is preferred, however, that when the alcohol employed is liquid at the reaction conditions an excess of alcohol over that required for the reaction be employed as the reaction solvent.

The products of the process of this invention vary from linear monomeric compounds to polycyclic monomeric compounds to crosslinked polymeric materials. When the alcohol or thiol employed is a monohydric alcohol or monomercaptan, the products are bis(organooxy) or bis(thioorganooxy) ethers of the general formula:

(IV) 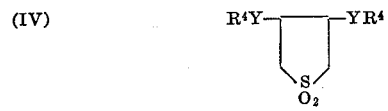

wherein Y is as defined above and $R^4$ is a monovalent organic radical. When difunctional alcohols or thiols are employed, depending on the position of the hydroxyl or mercapto groups, the products can be polycyclic compounds or difunctional compounds of the formulae:

(V) 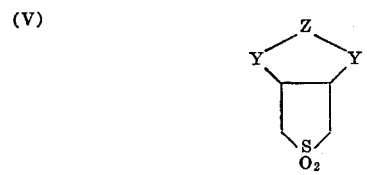

(VI) 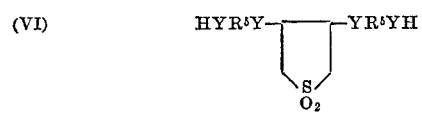

wherein Y is as defined above; Z is a divalent organic radical having from 1 to 2 carbons between the valence bonds and containing from 1 to 20 carbons; and $R^5$ is a divalent organic radical of from 1 to 20 carbons. Compounds represented by Formula V are favored when there are less than three carbon atoms between the hydroxyl or mercapto groups, and particularly when the hydroxyl or mercapto groups are at the end of a chain. For example, 1,2-diols more readily yield polycyclic compounds than do long chain diols wherein the hydroxyl groups, even though on adjacent carbon atoms, are in the center rather than the end of the carbon nucleus. When tri- and higher functional alcohols or mercaptans are employed, the products can be highly crosslinked materials. For example, when a cellulosic material, such as cotton, is employed, one can crosslink the cellulose to impart wash-and-wear properties to the cellulosic material.

When the process of this invention is employed to crosslink cotton or other cellulosic materials, it is preferred to employ from about 1 to about 15 weight percent of 3,4-dihalotetrahydrothiophene-1,1-dioxide. Amounts of less than about 1 percent are generally insufficient to provide any improvement in properties of the fabric, and amounts of greater than about 15 percent generally result in a fabric having a harsh and boardy hand. In this embodiment, the fabric is impregnated with the dihalotetrahydrothiophene-1,1-dioxide by known techniques, such as spraying, padding and the like, generally in solution or suspension in an inert diluent, and thereafter impregnated with the basic catalyst to effect the treatment. Curing is effected by heating, if desired, although the use of room temperature is sufficient.

A preferred class of products are the 3,4-bis(olefinically-unsaturated aliphatic hydrocarbyloxy)tetrahydrothiophene-1,1-dioxides and their thio derivatives of the formula:

(VII) 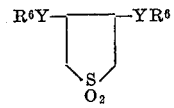

wherein Y is as defined above and each $R^6$ is a monovalent, monoolefinically-unsaturated aliphatic hydrocarbon group of from 3 to about 20 carbons wherein the olefinic double bond is at least one carbon atom removed from the oxygen or sulfur atom. For example, each $R^6$ group can be alkenyl such as allyl, butenyl, hexenyl, decenyl, octadecenyl and the like; cycloalkenyl such as cyclopentenyl, cyclohexenyl, bicyclo[2.2.1]heptenyl, tricyclo[5.2.1.0]decenyl; cycloalkenylalkyl such as cycloheptenylmethyl, cyclohexenylamyl, cycloheptenylethyl and the like; alkylcycloalkenyl such as methylcycloheptenyl, ethylcycloheptenyl and the like; etc.

The 3,4-bis (monoolefinically unsaturated aliphatic hydrocarbyloxy)tetrahydrothiophene-1,1-dioxides are readily converted to their corresponding diepoxides by any convenient method. One such method comprises the reaction of the diolefin with a solution of peracetic acid in ethyl acetate at a temperature of from 25° C. to 80° C. for a period of time sufficient to introduce oxirane oxygen at the site of both carbon to carbon double bonds. The resulting products are 3,4-bis-(vic-epoxy saturated hydrocarbyloxy)tetrahydrothiophene - 1,1-dioxides of the formula:

(VIII) 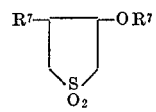

wherein each $R^7$ is a monovalent vic-epoxy saturated hydrocarbon group of from 3 to about 20 carbons wherein the vic-epoxy group, i.e., the

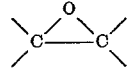

group, is at least one carbon atom removed from the oxygen atom. Thus, each $R^7$ group can be vic-epoxyalkyl such as 2,3-epoxypropyl, 2,3-epoxybutyl, 2-methyl-2,3-epoxypropyl, 2,3-epoxypentyl, 4,5-epoxyhexyl, 9,10-epoxydecyl, 9,10-epoxyoctadecyl and the like; vic-epoxycycloalkyl such as 2,3-epoxycyclopentyl, 3,4-epoxycyclohexyl, 4,5-epoxycycloheptyl, 3-oxatricyclo[3.2.1.0$^{2,4}$]oct-6-yl, 3-oxatetracyclo[4.4.3.1$^{7,10}$.0$^{2,4}$]undec 8 - yl, and the like; vic-epoxycycloalkylalkyl such as 2,3 - epoxycyclopentylmethyl, 3,4 - epoxycyclohexylamyl, 3,4-epoxycycloheptylethyl and the like; alkyl-vic-epoxycycloalkyl such as 2-ethyl - 3,4 - epoxycycloheptyl, 5-amyl-3,4-epoxycyclohexyl, 3-ethyl-3,4-epoxycyclohexyl and the like; etc.

In a similar manner, the thio analogs are converted to bis(epoxyhydrocarbylsulfonyl)tetrahydrothiophene-1,1-dioxides of the formula:

(IX) 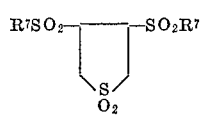

wherein $R^7$ is as defined above. In this case the peracid should be employed in an amount sufficient to oxidize the thio group to the sulfonyl group and the olefinic double bond to the vic-epoxy group. In conducting this reaction it is preferred that a portion of the peracid be added at a temperature in the range of 15 to 35° C. for the oxidation of the thio group, and the balance be added at a temperature of from 40° C. to 70° C. to epoxidize the double bond.

The diepoxides of this invention can be employed in combination with active organic hardeners to produce polymerizable compositions, as well as the thermosetting intermediate reaction products and cured, polymerized products resulting therefrom. The polymerizable compositions can be readily handled in resin-forming operations such as coating, laminating, bonding, molding, casting, potting and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications and unexpected advantages and results will become apparent upon a consideration of the various embodiments of the invention which are discussed hereinafter.

The active organic hardeners are employed in a curing amount, i.e., an amount which is sufficient to cause the curable system to become a thermosetting or thermoset resin in accordance with the teachings of the instant specification. Representative active organic hardeners include polycarboxylic acids, polycarboxy polyesters, polycarboxylic acid anhydrides, polyols, i.e., polyhydric phenols and polyhydric alcohols, polythiols, polyisocyanates, polythioisocyanates, polyacyl halides, and the like. The novel compositions can contain one diepoxy sulfone or a mixture of diepoxy sulfones as well as one active organic hardener or a mxiture of active organic hardeners.

The curable compositions of the invention can be prepared by mixing the diepoxy sulfone(s) with the active organic hardener(s), preferably under agitation so as to obtain a homogeneous mixture. The order of addition of the components does not appear to be critical. When a solid or highly viscous diepoxy sulfone or active organic hardener is employed heating is advantageous in facilitating the formation of a solution. In preparing homogeneous mixtures, it is advantageous to employ a temperature as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 10° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable copositions is that at which said compositions form a uniform melt, whereas for coatings and the preparation of laminates, the use of solvents will allow the use of lower temperatures.

The time for effecting the partial cure or complete cure will be governed, to an extent, by several factors such as the particular diepoxy sulfone(s) employed, the particular active organic hardener(s) employed, the proportions of diepoxy sulfone and active organic hardener, the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to one week, depending upon the correlation of such factors as illustrated above.

If desired, catalysts can be incorporated into the curable compositions of the invention to increase the cure rate and/or reduce the gelation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.005 to 15 weight percent, preferably from about 0.01 to 5 weight percent, based on the weight of the diepoxy sulfone(s) component, are advantageous in forming valuable thermoset resins from the curable compositions.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoridedipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyl-dimethylamine, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

In one preferred embodiment the invention is directed to novel curable, partially cured, and cured compositions comprising diepoxy sulfone and polycarboxylic acid in such relative amounts as provide from about 0.1 to about 2.0 carboxyl groups, i.e., —COOH groups, of the polycarboxylic acid per epoxy group, i.e.,

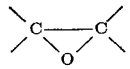

group, of the diepoxy sulfone, and preferably from about 0.3 to about 1.2 carboxyl per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic aid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, betathydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic acid with an olefinically unsaturated monomer such as butadiene, styrene, ethyl acrylate, vinyl halide, and the like also can be employed. In addition, the dimerized and trimerized unsaturated fatty acids, of, for example, linoleic acid, oleic acid, linolenic acid, undecylenic acid, and the like are useful. Polycarboxylic acids which have melting points below about 250° C. are desirable; the hydrocarbon dicarboxylic acids possessing melting points below about 200° C. are preferred.

In a second preferred embodiment the invention is directed to novel curable, partially cured, and cured compositions comprising diepoxy sulfone and polycarboxylic acid anhydride in such relative amounts so as to provide from about 0.1 to about 4.0 carboxyl groups of the polycarboxylic acid anhydride per epoxy group of the diepoxy sulfone, and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, tetrahydrophthalic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, lower alkyl substituted bicyclo[2.2.1]hept-2-ene-2,3-dicarboxylic anhydride, and the like. Mixtures of anhydrides, polymeric anhydrides or mixed polymeric anhydrides of sebacic, adipic, pimelic, cyclohexane-1,4-dicarboxylic, terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

In a third preferred embodiment, the invention is directed to novel curable, partially cured, and cured compositions comprising diepoxy sulfone and polyol in such relative amounts as provide from about 0.1 to about 2.0 hydroxyl groups, i.e., —OH groups, of the polyol per epoxy group of the diepoxy sulfone, and preferably from about 0.2 to about 1.0 hydroxyl group per epoxy group. By the term "polyol," as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative examples of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylene polypropylene glycols, trimethylene glycol, the butanediols, the butenediols, the pentanediols, the pentenediols, 2-ethyl-1,3-hexanediols, the hexenediols, 2-methoxy-2,4-dimethyl-1,5-pentanediol, 12,13-tetracosanediol, polyglycerol, 1,1,1-trimethylolpropane, pentaerythritol, sorbitol, the polyvinyl alcohols, the octenediols, the cyclopentanediols, the cyclohexanediols, the lower alkyl substituted cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below 250° C. are desirable; those polyols having melting points below about 200° C. are preferred.

A fourth preferred embodiment of the invention is directed to novel curable, partially cured, and cured compositions comprising diepoxy sulfone and polycarboxy polyesters in such relative amounts as provide from about 0.1 to about 2.0 carboxyl groups of the polycarboxy polyester per epoxy group of the diepoxy sulfone, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups contained in the amount of polyhydric alcohol so that the resulting esterified product, i.e., polycarboxy polyester, contains at least two free carboxyl groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising diepoxy sulfone and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the diepoxy sulfone. For instance, to a curable composition comprising diepoxy sulfone and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the polycarboxylic acid is less than one. On this basis the modifier can be considered to be the minor component in relation to the polycarboxylic acid. As a second illustration, if the curable composition comprises diepoxy sulfone and polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A fifth highly preferred embodiment is directed to curable and partially cured compositions (thermosetting intermediate reaction products that are viscous liquids or solids) comprising diepoxy sulfone and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment the invention is directed to the preparation of valuable varnishes which are obtained by the reaction of diepoxy sulfone with aliphatic monocarboxylic acids, at elevated temperatures, e.g., about 100° to 200° C., for a period of time ranging from 0.5 to 10 hours, and longer, followed by homopolymerizing the resulting reaction product (which contains residual of free epoxy and hydroxyl groups) with a catalyst such as those described previously, preferably at a temperature in the range of from about 25° to 200° C., to thus produce high molecular weight polymeric products commonly known to the art as a varnish. The amounts of aliphatic monocarboxylic acid and diepoxy sulfone employed are such so as to provide from about 0.3 to about 0.7 carboxyl group of monocarboxylic acid per epoxy group of diepoxy sulfone. The unsaturated aliphatic monocarboxylic acids are preferred. Illustrative acids include hexanoic acid, caprylic acid, lauric acid, capric acid, myristic acid, oleic acid, linoleic acid, linolenic acid, oleostearic acid, licanic acid, ricinoleic acid, hexenoic acid, hexadienoic acid, octenoic acid. Acids derived from natural sources such as castor oil, dehydrated castor oil, coconut oil, cottonseed oil, oiticica oil, perilla oil, olive oil, safflower oil, sardine oil, soyabean oil, tall oil, tung oil, and the like, are advantageous to employ both from an economy standpoint and since highly useful varnishes result from the process. If desired, the reaction between diepoxy sulfone and the aliphatic monocarboxylic acid can be effected in the presence of a catalyst such as those described previously, and also, the reaction can be conducted in the presence of an inert normally-liquid organic medium. Suitable media include, for instance, the aromatic hydrocarbon, e.g., benzene, toluene, xylene, and the like; the saturated aliphatic and cycloaliphatic hydrocarbons, e.g., hexane, heptane, cyclopentane, cyclohexane, lower alkyl substituted cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like.

The homopolymerizing of the reaction product which contains residual or free epoxy and hydroxyl groups can also be effected, if desired, in the presence of an inert normally-liquid organic medium such as those illustrated supra. The progress of the homopolymerization reaction can be observed by determining the relative viscosity of samples drawn from the reaction mixture. In this manner it is possible to produce partially polymerized compositions or essentially complete polymerized compositions.

The polymerized compositions of this embodiment generally are obtained as very viscous products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt octanoate, and the like. The drying compositions can be treated in the various ways familiar to the varnish and paint industries to produce special or advantageous effects.

In a still further preferred embodiment valuable varnish compositions can be obtained by the reaction of diepoxy sulfone with polyols, at a temperature in the range of from about 25° to 250° C., for a period of time ranging from about 0.5 to 10.0 hours, and longer, followed by partial or essentially complete esterification of the fusible, polymeric polyhydric product with an aliphatic monocarboxylic acid, at elevated temperatures, to produce high molecular weight polymeric products (varnishes) which may contain residual or free hydroxyl groups. The proportions of polyol and diepoxy sulfone employed are such as to provide from about 0.5 to about 1.5 hydroxyl groups of polyol per epoxy group of diepoxy sulfone. The polyols and aliphatic monocarboxylic acids which can be employed have been illustrated previously. The use of catalysts and solvents, if desired, have also been discussed supra.

As further embodiments, valuable thermoset resins can be prepared from curable compositions comprising a diepoxy sulfone(s), an active organic hardener(s), and other polyepoxides such as limonene dioxide, 4-vinylcyclohexane dioxide, dicyclopentadiene dioxide, divinylbenzene dioxide, 3,4-epoxy-6-methylcyclohexylmethyl, 3,4-epoxy-6-methylcyclohexanecarboxylate, diethylene glycol bis(3,4-epoxycyclohexanecarboxylate), bis(2,3-epoxycyclopentyl) ether, bis(3,4-epoxycyclohexylmethyl)pimelate, 1,1,1-tri-methylolpropane tris(3,4 - epoxycyclohexanecarboxylate), the polyglycidyl polyethers of polyhydric phenols, and the like. The curing of these novel curable compositions has been disclosed supra.

In some instances, the diepoxy sulfone is a mobile liquid thus making it admirably suitable as a reactive diluent when incorporated into various viscous curable systems containing a polyepoxide. In such cases, the diepoxy sulfone acts as a diluent thus reducing the viscosity of the curable system, and in addition, the diepoxy sulfone takes part in the curing reaction as a reactive component.

The thermoset cured resins of the invention vary from soft and flexible to hard and rigid products, depending upon the proportion, the functionality, and the chain length of the active organic hardener(s) employed. These resins are insoluble in many of the organic solvents. The hard, infusible, rigid, thermoset resins can be machined to desired shapes and configurations, and they can be polished to provide appealing finishers. The novel compositions, as indicated throughout the specification, are highly useful and valuable in fields such as the coatings, laminating, molding, encapsulation, etc., arts.

The epoxyethers and epoxysulfones of this invention also find utility in the treatment of cellulosic materials to impart wash and wear properties thereto. The treatment is effected by impregnating the fabric to be treated in any suitable manner with an effective amount of the diepoxide, generally from about 1 to about 15 weight percent, and a catalytic amount of a curing agent.

The curing agent is an acid-acting material, by which term is meant, in addition, to acids, those materials which, although not classified as acids, act as such. These materials include, inter alia, organic and inorganic acids and their anhydrides, such as citric acid, acetic acid, acetic acid anhydride, butyric acid, caproic acid, phthalic acid, phthalic acid anhydride, tartaric acid, aconitic acid, oxalic acid, succinic acid, succinic acid anhydride, lactic acid, maleic acid, maleic acid anhydride, fumaric acid, glutaconic acid, malonic acid, acetoacetic acid, naphthalic acid, trimellitic acid, phosphoric acid, boric acid, sulfonic acid, perchloric acid, persulfuric acid, and p-toluenesulfonic acid, metal salts such as zinc fluoborate, magnesium perchlorate, copper fluoborate, zinc persulfate, zinc phosphate, ferrous perchlorate, nickel fluoborate, manganese phosphate and strontium fluoborate; and amine hydrochlorides such as hydrochlorides of aniline, benzylidene, n-propylamine, di-n-butylamine, dibenzylamine, triethylamine, alpha - phenylethylamine, alpha-naphthylamine, beta-aminoanthraquinone, 1,3-diaminoanthraquinone, piperidine, pyridine, quinoline, morpholine, pyrrole and, quinidine, and hydrochlorides of hydroxyamines such as 2-amino-2-methylpropanol and isobutanolamine.

Particularly preferred curing agents are the organic and inorganic acids containing no more than 12 carbon atoms, and the salts of metals having an atomic weight of from 24 to 210 and an inorganic acid, the anion portion of which contains at least two dissimilar elements having an atomic weight above 2, such as oxalic acid, citric acid, succinic acid, zinc fluoborate, copper perchlorate, magnesium perchlorate, barium persulfate, iron perchlorate and the like.

Still more particularly preferred are the salts of metals of groups I to IV and VIII of the periodic table of elements and an inorganic acid, the anion portion of which contains at least two dissimilar elements having an atomic weight above 2, and particularly inorganic acids of the formula:

(X) 

wherein N is a non-metal having an atomic weight above 2, L is an element which tends to gain from 1 to 2 electrons in its outer orbit, such as oxygen and fluorine, $c$ is an integer, $d$ is an integer having a value greater than 1, and $b$ equals the valency of the radical $[(N)_c(L)_d]$, such as sulfuric acid, fluoboric acid, fluosilicic acid, persulfuric acid, phosphoric acid and the like.

The catalytic amount of curing agent can vary from about 0.5 to about 30 weight percent of the epoxide, depending upon the degree of crosslinking desired and the curing agent. It is preferred to employ 0.5 to 20 weight percent of the organic acids, from 1 to 15 weight percent of the metal salts and from 1 to 20 weight percent of the amine hydrochlorides.

The following examples are illustrative.

EXAMPLE 1

To a stirred solution of 43 grams of 80 percent potassium hydroxide in 250 ml. of methanol was added a solution of 67 grams of 3,4-dichlorotetrahydrothiophene-1,1-dioxide in 150 ml. of methanol. The resulting mixture was maintained below 50° C. for 2 hours with stirring. The reaction mixture was filtered and then evaporated to give an essentially quantitative yield of 3,4-bis(methoxy)-tetrahydrothiophene-1,1-dioxide which, after crystallization from water, melted at 57.5 to 59.5° C.

EXAMPLE 2

To a stirred slurry of 180 grams of 97 percent sodium hydroxide and 700 grams of allyl alcohol maintained at 25-35° C. was added a slurry of 378 grams of 3,4-dichlorotetrahydrothiophene-1,1-dioxide in 460 grams of allyl alcohol. The resulting mixture was heated at 35–40° C. for 30 minutes and then neutralized with hydrochloric acid. After evaporation of volatile materials, the residue was extracted with acetone. The extract was evaporated to yield 460 grams of liquid 3,4-bis(allyloxy)-tetrahydrothiophene-1,1-dioxide. The residue was distilled to yield 3,4-bis(allyloxy) tetrahydrothiophene-1,1-dioxide at 161° C. and 0.4 mm. Hg.

*Analysis.*—Calculated for $C_{10}H_{16}O_4S$ (percent): C, 51.7; H, 6.94; S, 13.78. Found (percent): C, 51.20; H, 6.60; S, 12.93.

The structure was confirmed by hydrogenation of the product to produce 3,4-bis(n-propoxy)tetrahydrothiophene-1,1-dioxide which boiled at 111° C. and 0.05 mm. Hg.

*Analysis.*—Calculated for $C_{10}H_{20}O_4S$ (percent): C, 50.82; H, 8.53; S, 13.57. Found (percent): C, 50.81; H, 8.32; S, 13.74.

EXAMPLE 3

A mixture of 200 grams of 3,4-bis(allyloxy)tetrahydrothiophene-1,1-dioxide produced in the manner described in Example 2 and 50 grams of ethyl acetate was charged to a two-liter flask equipped with stirrer, reflux condenser, thermometer and dropping funnel. After heating the mixture to 60° C., 597 grams of a 25.5 percent solution of peracetic acid in ethyl acetate was added dropwise with stirring over 85 minutes, and the resulting mixture was heated at 60–64° C. for an additional 9 hours, at which time analysis for unreacted peracetic acid indicated a 97.3 percent conversion. Ethyl acetate, acetic acid and unreacted peracetic acid were removed by azotropic distillation with ethylbenzene at 30 mm. Hg to yield as a residue product 3,4-bis(2,3-epoxypropoxy)tetrahydrothiophene-1,1-dioxide in a purity of 86.6 percent.

This residue product was again reacted as described above with 89.4 grams of the peracetic acid-ethyl acetate solution and there were recovered 202 grams of the diepoxide having a purity of 90.5 percent. Residual unsaturation of the product was 2.9 percent based on starting material. The acidity of the product, calculated as acetic acid, was 0.18 percent, and the color was 80 based on the A.P.H.A.-Hazen platinum cobalt scale.

EXAMPLE 4

A sample of the 3,4-bis(glycidyloxy) tetrahydrothiophene-1,1-dioxide prepared as described in Example 3 was admixed with methylene dianiline in a ratio of one epoxy group per amine hydrogen, and, after degassing at room temperature and 1 mm. Hg for 5 minutes, was heated at 100° C. for 1 hour and then 160° C. for 2 hours to produce a resin. The resin had a heat distortion temperature of 112° C., a tensile strength of 11,300 p.s.i., an ultimate elongation of 1.9%, and a water pick up after a 24-hour boil of 12.6 percent.

EXAMPLE 5

A sample of cotton broadcloth was padded to 100 percent wet pick up with an aqueous suspension containing 6.0 weight percent 3,4-bis(glycidyloxy)tetrahydrothiophene-1,1-dioxide, 1.25 weight percent zinc fluoborate, 0.2 weight percent zinc oxide, 0.15 weight percent urea, 0.2 weight percent of a polyethylenoxy ether of trimethylmonanol sold by Union Carbide Corporation under the trademark "Tergitol TMN," 2.0 weight percent of a polyethylene glycol compound sold by Union Carbide Corporation under the trademark "Carbowax 20M," 0.5 weight percent of a polyethylene emulsion sold by Spencer Chemical Corporation under the trademark "Poly-EM 40," and 1.5 weight percent of a polyethyleneoxide ether of nonylphenol sold by Union Carbide Corporation under the trademark "Tergitol NP–40." The impregnated cloth was dried by heating at 175° F. for 4 minutes and cured by heating at 290° C. for 1.5 minutes. The treated fabric had a dry crease recovery angle (warp plus fill) of 249; a tumble-dry wash-wear index of 5—, a spin-dry wash-wear index of 3—, a filling tear strength of 440 grams and a filling break strength of 26 pounds.

In this and the next two examples, the tests employed in evaluating the treated fabrics were:
(1) Wash and Wear Index—AATCC tentative test method 88–1961T.
(2) Crease Recovery Angle—ASTM, D–1295–60T and AATCC tentative test method 66–1959, and reported as the sum of the values obtained in both the warp and filling directions.
(3) Tear Strength—ASTM D–1424–59.
(4) Break Strength—ASTM D–1682–59T.

EXAMPLE 6

A sample of cotton printcloth was padded to 100 percent wet pickup with an aqueous suspension of 7.0 weight percent, 3,4 - bis(glycidyloxy)tetrahydrothiophene-1,1-dioxide, 1.5 weight percent zinc fluoborate, 0.2 weight percent zinc oxide, 0.15 weight percent urea, 0.2 weight percent "Tergitol TMN," and 0.15 weight percent "Tergitol NP–40." The impregnated fabric was cured by heating at 340° F. for 115 seconds. The cured fabric had a tumble-dry wash-wear index of 5—, a spin-dry wash-wear index of 3+, a filling tear strength of 272 grams and a filling break strength of 26 pounds.

EXAMPLE 7

Three samples of a cotton broadcloth were impregnated to 100 percent wet pick up with various formulations containing 3,4 - bis(glycidyloxy)tetrahydrothiophene-1,1-dioxide, cured by heating, and evaluated for wash-wear properties. The formulation compositions, curing conditions and test results are summarized in tabular form below.

| Run | 1 | 2 | 3 |
|---|---|---|---|
| Formulation, weight percent: | | | |
| 3,4-bis(glycidyloxy)tetrahydrothiophene-1,1-dioxide | 4.0 | 4.0 | 4.0 |
| Zinc fluoborate | 1.5 | 1.5 | 1.1 |
| Zinc oxide | 0.2 | 0.2 | 0.2 |
| Urea | 0.15 | 0.15 | 0.15 |
| "Tergitol TMN" | 0.1 | 0.1 | 0.1 |
| "Carbowax 20M" | 0.3 | 0.3 | 0.3 |
| "Fabritone 23"* | 0.4 | 0.4 | 0.4 |
| "Tergitol NP–40" | 1.5 | 1.5 | 1.5 |
| Formaldehyde | 1.0 | 1.0 | 1.0 |
| Cure: | | | |
| Temperature, °F | 340 | 330 | 340 |
| Time, seconds | 115 | 115 | 115 |
| Properties: | | | |
| Dry crease recovery angle (W+F) | 260 | 250 | 261 |
| Wash-wear index: | | | |
| Tumble dry | 5 | 5 | 5 |
| Spin dry | 4 | 4— | 4— |
| Filling strength: | | | |
| Tear, grams | 356 | 248 | 240 |
| Break, pounds | 19 | 18 | 18 |

* Trademark for a polyethylene glycol monostearate sold by C. H. Patrick Corp. as a softening agent.

EXAMPLE 8

Employing apparatus and procedures similar to those described in Example 2, allylmercaptan is reacted with 3,4 - dichlorotetrahydrothiophene-1,1-dioxide to produce 3,4-bis(thioallyloxy)tetrahydrothiophene-1,1-dioxide.

EXAMPLE 9

Employing apparatus and procedures similar to those described in Example 3, 3,4-bis(thioallyloxy)tetrahydrothiaphene-1,1-dioxide is reacted with peracetic acid to produce 3,4 - bis(2,3 - epoxypropylsulfonyl)tetrahydrothiophene-1,1-dioxide. This diepoxide is reacted in a manner similar to that described in Example 4 to produce an epoxy resin, or can be employed to crosslink cotton in the manner disclosed in Example 5.

EXAMPLE 10

To a stirred solution of 20 grams of 97 percent sodium hydroxide in 304 grams of 2-(methoxy)ethanol maintained at 25 to 30° C. was added 47 grams of 3,4-dichlorotetrahydrothiophene-1,1-dioxide. The resulting mixture was heated at 40–55° C. with stirring for 45 minutes and then neutralized with hydrochloric acid. After evaporation and extraction with acetone, the residue was distilled to yield 59 grams of 3,4-bis(2-methoxyethoxy)tetrahydrothiophene-1,1-dioxide boiling at 164–171° C. at 0.2–0.3 mm. Hg.

*Analysis.*—Calculated for $C_{10}H_{20}O_6S$ (percent): C, 44.76; H, 7.51; S, 11.95. Found (percent): C, 44.77; H, 7.38; S, 12.50.

EXAMPLE 11

To a stirred mixture of 93 grams of 97 percent sodium hydroxide in 1000 grams of 2-ethylhexanol which was heated at 40–46° C. was added 189 grams of 3,4-dichlorotetrahydrothiophene-1,1-dioxide over 1.5 hours. The resulting mixture was heated at 41–67° C. with stirring for an additional 2.25 hours. After filtration, neutralization of the filtrate with hydrochloric acid, and stripping of volatiles, the residue was treated with activated carbon and filtered to give 182 grams of crude 3,4-bis(2-ethylhexoxy) tetrahydrothiophene-1,1-dioxide. The crude product was vacuum distilled to give 166 grams of product boiling at 197 to 203° C. at 0.6 mm. pressure.

*Analysis.*—Calculated for $C_{20}H_{40}O_4S$ (percent): C, 63.78; H, 10.70; S, 8.52. Found (percent): C, 62.98; H, 10.28; S, 8.42.

EXAMPLE 12

To a stirred suspension of 45.5 grams of 97 percent sodium hydroxide and 158 grams of n-decanol in 500 ml. of tetrahydrofuran was added 94.6 grams of 3,4-dichlorotetrahydrothiophene-1,1-dioxide. After refluxing for 3.5 hours, there were recovered 41 grams of 3,4-bis(n-decoxy)tetrahydrothiophene-1,1-dioxide, which, after recrystallization from methanol, melted at 54.0–4.5° C.

*Analysis.*—Calculated for $C_{24}H_{48}O_4S$ (percent): C, 66.62; H, 11.18; S, 7.42. Found (percent): C, 66.55; H, 10.44; S, 7.46.

EXAMPLE 13

To a stirred solution of 43 grams of 80 percent potassium hydroxide in 310 grams of ethylene glycol maintained at 35–45° C. was added a slurry of 47 grams of 3,4-dichlorotetrahydrothiophene - 1,1 - dioxide in 124 grams of ethylene glycol. After heating at 40–45° C. for 3 hours, allowing the mixture to stand for two days and evaporate, there were recovered 44 grams of 6,6-dioxotetrahydrothieno[3,4-b]-p-dioxane which, after recrystallization from aqueous acetone and then water, melted at 122.5–3.5° C.

*Analysis.*—Calculated for $C_6H_{12}O_4S$ (percent): C, 40.44; H, 5.66; S, 17.99. Found (percent): C, 40.39; H, 5.54; S, 17.95.

EXAMPLE 14

To a stirred solution of 35 grams of potassium hydroxide in 200 ml. of 1,4-butanediol maintained at 50–60° C. was added a solution of 47 grams of 3,4-dichlorotetrahydrothiophene-1,1-dioxide in 100 ml. of 1,4-butanediol. An additional 100 ml. of 1,4-butanediol was added and the resulting mixture was heated at 50–60° C. for 2 hours. After neutralization with phosphoric acid, filtration and distillation to remove unreacted diol there were recovered 51 grams of 3,4 - bis(4 - hydroxybutoxy)tetrahydrothiophene-1,1-dioxide.

*Analysis.*—Calculated for $C_{12}H_{24}O_6S$ (percent): S, 10.82; OH (meq./gm.), 6.75. Found (percent): S, 11.91; OH, 6.00.

EXAMPLE 15

Employing apparatus and procedures similar to those described in Example 11, except that an aqueous solution of 37% formaldehyde was substituted for the 1,4-butanediol, there was recovered 11.7 grams of 6,6-dioxotetrahydrothieno[3,4-b]-1,3-dioxolane which, after recrystallization from methanol, melted at 113.5–114.5° C.

*Analysis.*—Calculated for $C_5H_8SO_4$ (percent): C, 36.57; H, 4.91; S, 19.53. Found (percent): C, 36.98; H, 4.79; S, 19.94, 19.67.

EXAMPLE 16

To a suspension of 20.9 grams of 97 percent sodium hydroxide in 247 grams of n-butyl mercaptan was added a solution of 47.3 grams of 3,4-dichlorotetrahydrothiophene-1,1-dioxide in 100 ml. of tetrahydrofuran. The reaction mixture was heated to 50–70° C. for 1½ hours, and then cooled to room temperature. After filtering the mixture to remove solids and vacuum stripping, there was recovered 72 grams of 3,4 - bis(n-thiobutoxy)tetrahydrothiophene-1,1-dioxide which, after recrystallization from isopropanol, melted at 52.0–52.5° C.

*Analysis.*—Calculated for $C_{12}H_{24}S_3O_2$ (percent): C, 48.61; H, 8.16; S, 32.44. Found (percent): C, 48.81; H, 7.93; S, 32.45.

EXAMPLE 17

Mercerized cotton printcloth was padded to approximately 100 percent wet pick-up with a solution containing 10 weight percent 3,4-dichlorotetrahydrothiophene-1,1-dioxide, 60 weight percent dioxane and 30 weight percent water. After drying for 2 minutes at 40° C., the fabric was padded to about 100 percent wet pick-up with a 5% aqueous sodium hydroxide solution, dried for 6 minutes at 40° C. and allowed to stand for 1 hour at room temperature. The fabric, after neutralization with acetic acid and washing, had a dry add-on of 3.3 weight percent, a wet warp crease recovery of 73 percent and a spin dry wash-wear index of 3—. The untreated cloth had a wet warp crease recovery of 47 percent and a spin dry wash-wear index of 1—.

What is claimed is:

1. A 3,4 - bis(monoolefinically-unsaturated hydrocarbyloxy)tetrahydrothiophene-1,1-dioxide having from 3 to 20 carbons and no unsaturation other than one olefinic double bond at least one carbon atom removed from an oxy group in each hydrocarbyloxy group thereof.

2. 3,4-bis(allyloxy)tetrahydrothiophene-1,1-dioxide.

3. A 3,4-bis(vic-epoxy saturated hydrocarbyloxy)tetrahydrothiophene-1,1-dioxide having from 3 to 20 carbons and the epoxy group at least one carbon atom removed from an oxy group in each epoxyhydrocarbyloxy group thereof.

4. 3,4-bis(2,3-epoxypropoxy)tetrahydrothiophene-1,1-dioxide.

5. The method for producing a polycyclic compound of the formula:

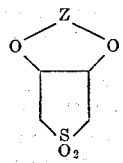

wherein Z is a divalent saturated aliphatic hydrocarbon radical of from 1 to 20 carbons which, when taken together with the two oxygens and the tetrahydrothiophene-1,1-dioxide group, forms a heterocyclic ring of from 5 to 6 ring members, which comprises adding 3,4-dihalotetrahydrothiophene-1,1-dioxide to a mixture of an aliphatic saturated dihydric alcohol of from 1 to 20 carbons wherein the hydroxyl groups are separated by from 1 to 2 carbons and an alkali metal hydroxide, said hydroxide being present in an amount sufficient to promote the reaction of said alcohol with said 3,4-dihalotetrahydrothiophene-1,1-dioxide.

6. The method as claimed in claim 5 wherein said dihydric alcohol is dihydroxymethane.

7. The method as claimed in claim 5 wherein said dihydric alcohol is ethylene glycol.

8. The method for producing 3,4-bis(hydroxyalkoxy)-tetrahydrothiophene-1,1-dioxide having from 3 to 20 carbons in each alkyl group thereof and at least 3 carbons between the hydroxyl and oxy group thereof, which comprises adding 3,4-dihalotetrahydrothiophene-1,1-dioxide to a mixture of a dihydric alcohol of from 3 to 20 carbons and having at least 3 carbons between the hydroxyl groups thereof, and an alkali metal hydroxide, said alkali metal hydroxide being present in an amount sufficient to promote the reaction of said alcohol with said 3,4-dihalotetrahydrothiophene-1,1-dioxide.

9. The method as claimed in claim 8 wherein said dihydric alcohol is 1,4-butanediol.

References Cited

UNITED STATES PATENTS 3,357,996   12/1967   Cobb _____ 260—332.1

OTHER REFERENCES

Wagner et al.: Synthetic Organic Chemistry, Wiley & Sons, London (1953), p. 226–8, 787–8.

HENRY R. JILES, Primary Examiner

C. M. SHURKO, Assistant Examiner

U.S. Cl. X.R.

260—79.3, 350.5